Figure 1:
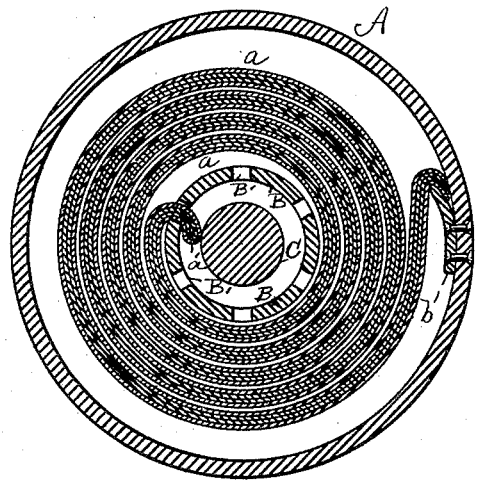

(No Model.)

P. C. MORSE.
COILED SPRING.

No. 456,833. Patented July 28, 1891.

WITNESSES
B. W. Williams.
J. M. Hartnett.

INVENTOR
Preston C. Morse
By his Atty.
Henry Williams

UNITED STATES PATENT OFFICE.

PRESTON C. MORSE, OF BOSTON, MASSACHUSETTS, ASSIGNOR OF ONE-HALF TO WILLIAM W. STALL, OF SAME PLACE.

COILED SPRING.

SPECIFICATION forming part of Letters Patent No. 456,833, dated July 28, 1891.

Application filed August 21, 1890. Serial No. 362,635. (No model.)

*To all whom it may concern:*

Be it known that I, PRESTON C. MORSE, a citizen of the United States, residing at Boston, Suffolk county, Massachusetts, have invented certain new and useful Improvements in Springs for Use on Bicycles and similar Structures, of which the following is a specification, reference being had to the accompanying drawings, forming a part hereof.

At the present day there are in use what are known as "Star" bicycles, in which, as in certain other machines, there are used certain rotary driving-drums which are turned in one direction by power mechanism and then released and turned backward by internal coiled springs to their original positions. The springs employed are necessarily quite long and of very considerable strength, and are wound and unwound at each action to such an extent that when constructed as usual in a single piece they are frequently fractured and the machine thereby disabled. This breakage is due in part to the fact that a spring of the requisite strength made in a single piece is necessarily so thick that it cannot be uniformly or advantageously tempered throughout its body and in part to the fact that the bending of the thick metal tends to change the relative lengths of the inner and outer surfaces to such an extent that the metal is subjected to severe internal strains. I overcome these difficulties by providing a laminated spring, a spring composed of two or more thin springs of equal length laid one over the other and connected at both ends, so that, although they operate jointly as a single spring, each section or layer is held at both ends and thus kept under tension independently of the others and adapted to serve in itself as a complete or distinct spring. The employment of the series of thin superposed springs is advantageous in that they may be more readily manufactured and more highly and perfectly tempered, and that when used jointly, each with connections at both ends, they possess greater elasticity and are under far less danger of breakage than the heavy springs of single thickness.

It is to be particularly noted as one of the advantages of my spring having each layer held at both ends that it will remain operative and permit the use of the machine, although any one or more of the whole number may be fractured.

Another advantage resides in the fact that the tensile strength of each layer is rendered fully available, and at the same time the several layers permitted to play endwise on each other as their changing curvature in winding and unwinding demands.

In the drawings I have for purposes of illustration shown my spring in the form in which I commonly use it in Star bicycles; but it is manifest that it may be modified as to the number of its laminæ and the details of the end connections or fastenings as may be demanded by the circumstances under which it is to be used, provided the essential characteristics above described are retained.

Figures 2, 3:
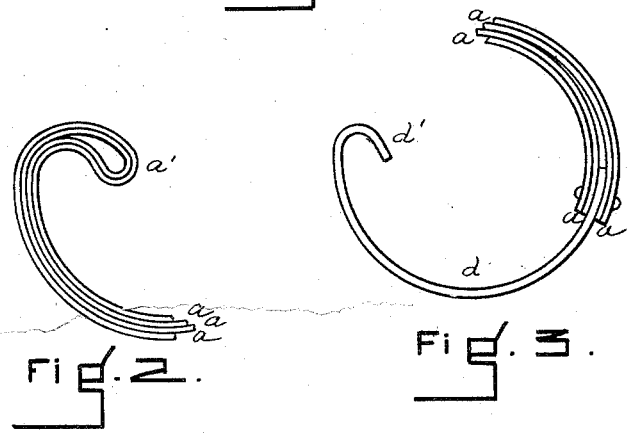

In the accompanying drawings, Figure 1 is a sectional view showing my spring with its outer end attached to a rotative drum or pulley and its inner end attached to a sleeve on a shaft of a Star bicycle. Fig. 2 is an enlarged side elevation of the inner end of the spring. Fig. 3 is a similar view of a modification.

The spring consists of a plurality of thin metal layers or leaves *a* of equal length, laid together longitudinally, one upon another, and wound as one into a coiled form, so that they form, jointly, a single laminated spring. At their outer ends all the laminæ are bent one over another into the form of a hook and engaged with an end piece or holder *b*, or otherwise fastened together, or to a common retaining device, so that each is independently held and kept in place if the others break, and also kept under tension independently and without reliance on the other members. At their inner ends the several layers are hooked together in essentially the same manner as at the outer ends and for the purposes named. If preferred, however, the leaves or layers may be cut off at the end, as shown in Fig. 3, and their ends riveted to a holder *d*, the only essential requirement being that the layers or leaves, each of which is in effect a spring in itself, shall be secured at both ends.

In the drawings the holder *b* at the outer end of the spring is shown as riveted to the inside of the rotatively-reciprocating drum A and the inner end of the spring shown as engaged in one of the usual cavities in the sleeve B.

Having thus described my invention, what I claim is—

1. The coiled spring consisting of a plurality of layers, each fastened at both ends.

2. The coiled spring consisting of the several layers or laminæ, each bent into hooks at both ends, the hooks of the several laminæ being combined as one at each end of the spring.

3. In combination with the internal collar and external drum, the intermediate coiled laminated spring having a plurality of the laminæ, each connected at one end to the collar and at the other end to the drum.

PRESTON C. MORSE.

Witnesses:
HENRY W. WILLIAMS,
J. M. HARTNETT.